3,228,749
PRODUCTION OF SPHERICAL URANIUM
NUCLEAR FUEL SUBSTANCES
Yumi Akimoto, Saitama-ken, Japan, and Yoshiyuki Suehiro, deceased, late of Saitama-ken, Japan, by Yosie Suehiro, executrix, assignors to Mitsubishi Kinzoku Kogyo Kabushiki Kaisha, Tokyo-to, Japan, a joint-stock company
No Drawing. Filed Feb. 6, 1963, Ser. No. 257,364
Claims priority, application Japan, Feb. 23, 1962, 37/6,424
8 Claims. (Cl. 23—14.5)

This invention relates to the production of spherical uranium nuclear fuel substances, and more particularly it relates to a new method of producing such nuclear fuel substances which has several highly desirable features.

A spherical nuclear fuel to be used for the purpose of manufacturing fuel elements of such types as the dispersion type or loose-packing type is required to have a smooth surface and good configuration and have, moreover, high density and few closed pores existing therein. For producing such a nuclear fuel, it has been the practice heretofore to resort to a method, for example, which comprises first sintering or melting at a high temperature uranium dioxide powder, then crushing the same, and further melting and/or grinding the same to transform the product into grains of spherical configuration. However, the conventional method just described has several disadvantages namely that a costly apparatus for sintering, grinding, and other process steps is necessary with the result that the process operations become expensive and moreover, the rate of recovery of the product is inferior. Consequently, the price of a spherical fuel produced by such a conventional method becomes extremely high.

Another conventional method comprises adding suitable binding agents and other substances to uranium dioxide powder, transforming the mixture into granular form by a mechanical molding process by means of such an apparatus as a granulator, and then subjecting the granular product to a treatment such as sintering in a current of hydrogen gas. This method, however, has disadvantages from which it cannot be freed easily—namely that a large number of closed pores remain within the particles of the product and that mechanical strength of the product is inferior.

It is a general object of the present invention to provide a method of producing spherical uranium nuclear fuel substances in which the above-described disadvantages of the conventional methods are eliminated or greatly reduced.

The foregoing object as well as other objects and advantages as will become apparent hereinafter have been achieved by the present invention, in which utilization is made of the fact that such nuclear raw materials as uranium trioxide and ammonium diuranate have low solubility in water and are hydrophilic.

Briefly and generally described, this invention provides a method which comprises dispersing and pulverizing such a nuclear raw material as above-mentioned in an oil medium, blending the same with water or water containing an additive for promoting affinity, and obtaining a spherical uranium compound through the transference of the dispersed powder in the oil medium to a suspended water phase.

The method according to this invention has several highly advantageous characteristics, the principal ones being as follows:

(1) By directly granulating the powder material, such double process steps which comprises sintering and molding the material once at high temperature, then carrying out melting and/or grinding can be eliminated;

(2) By carrying out granulation at the raw-material stage, possibilities, which may invite surface oxidation due to processing to be conducted after reduction of the material to uranium dioxide and which may require repeated reduction, can be eliminated;

(3) By suitably selecting the raw-material powder and granulating conditions, a spherical uranium compound of high density containing only a small number of closed pores therein can be produced; and (4) Moreover, such a compound as described above can be produced at substantially low cost.

The particle size and properties of the product produced by the method of this invention are influenced by such factors as: the particle size, surface condition, and chemical properties of the raw-material powder; the properties of the oil medium; the initial dispersion state of the raw-material powder with respect to the oil medium; the composition and quantity of the added water phase; the method of blending the two phases of water and oil; interfacial tensions of the oil phase, the water phase, and the product particles.

When a water phase is blended with an oil medium wherein a hydrophilic uranium compound as afore-mentioned is dispersed, the said uranium compound gradually moves to the water-phase side. The tendency for this movement has a relation to the hydrophilic property of the oil medium and the powder dispersed therein. For example, a powder moves relatively promptly to the water phase when it has been dispersed in benzene, a rather hydrophilic medium; whereas the powder dispersed in kerosene, a rather hydrophobic medium, moves slowly. Furthermore, whereas such highly hydrophilic substances as uranium trioxide move relatively readily to the water phase, such substances as triuranium octoxide which have low hydrophilic property have relatively greater difficulty in moving to the water phase.

The degree of this movement can be controllably adjusted by adding various additives into the oil medium or the water phase. If only the ease or difficulty with which this movement to the water phase occurs is considered, the more highly hydrophilic the surface of the dispersed powder is, the better it is. On the other hand, however, hydrophilic powders have the tendency to aggregate or flocculate in the oil medium, and if this aggregation is maintained even after transfer to the water phase, voids will be created within the aggregated particles, and such adverse results as irregularity in the configuration of the product aggregate granules will be incurred.

Accordingly, in order to disperse the powder uniformly and thoroughly in the oil medium at the initial stage of the process, it is necessary to regulate the hydrophilic property of the oil medium as a dispersion medium and of the surfaces of the dispersed powder. It has been found that, for this purpose, such high-grade alcohols as octadecyl alcohol, as stearic acid, fatty acids, esters, and neutral and anionic interface activators are highly effective when added to the oil medium.

It is another important requisite of the method according to the present invention to find a condition that, by blending a relatively small quantity of water phase with the oil medium, the powder material dispersed in the oil medium is caused to be transferred readily to the water phase and form granules. In the case of a hydrophilic compound which readily forms a hydrate, such as uranium trioxide, the transfer to the water phase is accomplished also with the mere addition of water. However, as was indicated hereinbefore, when the degree of hydrophilic property of the powder material surface is regulated so as to increase the degree of dispersion into the oil medium, it is generally necessary to add an affinitizing agent to the water-phase side so as to facilitate the transfer of the powder material to the water phase. As affinitizing agents such inorganic substances as, for example, mineral acid, ammonium carbonate, uranyl nitrate, uranyl chloride, ammonium oxalate, and the like which moisten and dissolve the raw-material powder to a certain degree and neutral or ionic interface activators and other substances which moisten and render hydrophilic property to the powder surfaces are used either individually or in combination, depending on the composition of the powder.

The effect of the above-named affinitizing agents may be thought to render uniformity to the surface of the raw-material powder, to facilitate the sliding action between the particles, and to make possible dense filling by rapidly moistening or dissolving to a certain degree the surfaces of the said powder, thereby producing strong bondage between the particles and increasing the strength and density of the product. As may be readily surmised from the above consideration, when the concentration or the quantity added of the affinitizing agent is excessive, the granulating efficiency decreases rapidly. Furthermore, when a high-density fuel such as spherical uranium dioxide fuel is required, the use of a large quantity of an affinitizing agent is not desirable because gas is generated during the subsequent step of thermal decomposition of the affinitizing agent leaving closed pores in the product. For example, when a nitric acid is used as an affinitizing agent in the granulation of uranium trioxide power, the preferable concentration of nitric acid in the aqueous phase is 0.3 N or less and the total quantity of the nitric acid-water phase to be added is of the order of 10 to 20 cc. per 100 grams of U, respectively.

In order to indicate still more fully the nature of this invention, the granulating process according to the present invention is described below in greater detail. First, the raw-material powder is dispersed uniformly in the oil medium. The particle size of the dispersed powder varies according to the purpose, but ordinarily it is preferably a few microns or less. For this reason, the step grinding and dispersing of the powder by a mechanical method, after it is added to the oil medium, is effective. When this oil medium with the powder dispersed therein and a relatively small quantity of water phase are blended and provided with dispersive power by such action as agitation, the powder particles move to the water phase and, at the same time, mutually adhere in an intimate manner with the water phase interposed therebetween in a thin-film state, whereby sperical granules of suitable size are formed and left in a suspended state in the oil phase.

In the blending of the oil medium in which the powder is dispersed in the water phase, the water phase may be added to the oil medium, or the oil medium may be added to the water phase. In either case, it is desirable that, prior to the moving of the powder to the water phase, the water phase be dispersed as liquid globules of suitable size in the oil medium. The size of the particles of the water phase dispersed in the oil medium can be controlled by such methods as regulation of surface tension between the water and oil phases by means of a suitable interface activator and by the use of a suitable agitating process.

The particle size of the particles subsequent to their transfer to the water phase should initially have a significant relation to the size of the liquid globules prior to the transfer of the powder material. This particles size, however, varies in time as the particles mutually adhere during agitation or are broken up by collision with the agitator blades. Mutual adhesion or breakage causes the shapes of the particles to become poor and the control of the particle size to become difficult. Therefore, suitable maintenance of the initial state is desirable. Accordingly, the volumetric ratio of the raw-material powder and the water phase is an important, prime factor of the present method. Values of this ratio have been determined experimentally, depending principally on the particle size and surface condition of the powder material.

In the case of a substance which forms a hydrate, such as ammonium diuranate, uranium trioxide, and uranium tetrafluoride, there is sufficient aqueous slurry-phase viscosity for forming globules by surface tension during the initial period when the powder material moves to the water phase. In time, the powder material absorbs water as a hydrate, the viscosity increases, and the granules attain a state of ample mechanical strength and property of preventing mutual adhesion. In some cases, it is preferable to toughen the surface of the granules at this stage by such a method as further adding a small quantity of the powder material or interface activator. The construction and rotational speed of the agitator are also important, being in relation to the afore-mentioned prime factor of the present method.

After elapse of a certain aging period following the blending of the water phase, the granules are filtered. The aging period is the period during which the powder material which has moved to the water phase forms a hydrate, and the granules come to attain a state wherein they have considerable mechanical strength. Although the said period varies with such factors as the properties of the powder material, the temperature, and the use of the surface activator, it is normally between one hour and a number of hours. After filtration, the product, a spherical uranium compound is cleaned a number of times with oil to remove adhering powder material, dried, then subjected to a subsequent process step, the nature of which depends on the purpose.

To facilitate a clearer understanding of the method according to the present invention a few examples of method procedure and results are presented below.

*Example 1*

Benzene was added to 300 grams of ammonium diuranate which has been dried at 120° C., and the mixture was ground for 4 hours in a ball mill. Then, 25 grams of octadecyl alcohol, which is a dispersion stabilizer, was added, and 500 cc. of benzene suspension was prepared. As this suspension was agitated by a flat type blade rotating at 600 r.p.m. in a one-litre vessel, 80 cc. of a 50 grams/litre solution of uranyl nitrate was added gradually. Then, after two hours of agitation, the process material was filtered, and spherical ammonium diuranate of 50-mesh average particle size was obtained. The rate of yield was 77%.

*Example 2*

250 grams of uranium tetrafluoride pulverized to 250-mesh or less particle size was dispersed in 500 cc. of kerosene. To this suspension was gradually added another suspension consisting if 100 cc. of kerosene containing, as dispersed material, 55 cc. of 2% ammonium oxalate and 1 cc. of polyoxyethylenealkylate which is an interface activator, and the mixture was agitated at 1,200 r.p.m. for 15 minutes. The granules thus obtained were filtered and washed, then vacuum dried, initially at 100° C., then subsequently at 250° C., whereupon spherical uranium tetrafluoride of 100-mesh average particle size was obtained.

*Example 3*

To 500 grams of uranium trioxide powder were added one litre of toluene, 50 grams of octadecyl alcohol, and 2.5 grams of Pellex which is the interface activator. Then, after 4 hours of ball-milling, this mixture was further ground in a homogenizer. Separately, in a 3-litre vessel, 50 grams of octadecyl alcohol, which is a dispersion stabilizer, was dissolved in one litre of benzene. To this solution 100 cc. of 60 grams/litre aqueous solution of uranyl nitrate was added, and the resulting mixture was agitated and caused to become a suspension by means of an agitator having blades consisting of stretched sheets of 30-mesh wire screen and rotating at 800 r.p.m. While this mixture was thus agitated, 750 cc. of the previously mentioned uranium trioxide slurry was added thereto during a period of ten minutes. Then, after 30 minutes, the remaining 250 cc. of the said slurry was added, and the agitation was continued for a further two hours. By filtering the resulting slurry on a 150-mesh wire screen, spherical uranium trioxide of 80- to 150-mesh particle size was obtained with a rate of yield of 85%. This spherical uranium trioxide was further dried at 100° C., then roasted at 300° C. for two hours, and subjected to reduction for three hours at 1,500° C. in a stream of hydrogen gas, whereby spherical uranium dioxide of a particle density of 10.28 grams/cc. was obtained.

The application of the present invention is not confined to only the production of spherical uranium dioxide fuel for the aforementioned dispersion-type or loose-packing-type fuel elements, but can be extended to the production of uranium compounds which are generally difficult to dissolve in water and are, moreover, hydrophilic. For example, the method of the present invention may be utilized for such purposes as granulating intermediate products in the uranium refining processes for uranium tetrafluoride, uranium trioxide, and other uranium compounds and producing starting materials for moving bed reaction and other processes.

Since it is obvious that many changes and modifications can be made in the above-described details without departing from the nature and spirit of the invention, it is to be understood that the invention is not to be limited to the details described herein except as set forth in the appended claims.

What is claimed is:

1. A method of producing spherical uranium nuclear fuel substances which comprises dispersing as a powder in an oil medium a uranium compound which is difficult to dissolve in water and is capable of forming a hydrate, blending said oil medium containing said dispersion of powdered uranium compound with an aqueous phase selected from the group consisting of water and a mixture of water and an affinitizing agent, said affinitizing agent being effective to moisten the surface of said powdered uranium compound and to facilitate the movement of said powdered uranium compound dispersed in said oil medium to said aqueous phase, and granulating said dispersed uranium compound by agitating said aqueous phase with said oil medium to disperse said aqueous phase as globules in said oil medium whereby said powdered uranium compound is transferred to said aqueous phase and is formed into spherical granules.

2. A method of producing spherical uranium nuclear fuel substances which comprises dispersing as a powder in an oil medium a uranium compound which is difficult to dissolve in water and is capable of forming a hydrate, said uranium compound being selected from the group which consists of uranium trioxide, ammonium diuranate and uranium tetrafluoride, blending said oil medium containing said disperison of powdered uranium compound with an aqueous phase selected from the group consisting of water and a mixture of water and an affinitizing agent, said affinitizing agent being effective to moisten the surface of said powdered uranium compound and to facilitate the movement of said powdered uranium compound dispersed in said oil medium to said aqueous phase, and granulating said dispersed uranium compound by agitating said aqueous phase with said oil medium to disperse said aqueous phase as globules in said oil medium, whereby said powdered uranium compound is transferred to said aqueous phase and is formed into spherical granules.

3. A method as defined in claim 2 wherein said uranium compound is uranium trioxide.

4. A method as defined in claim 2 wherein said uranium compound is ammonium diuranate.

5. A method as defined in claim 2 wherein said uranium compound is uranium tetrafluoride.

6. A method of producing spherical uranium nuclear fuel substances which comprises dispersing as a powder in an oil medium a uranium compound which is difficult to dissolve in water and is capable of forming a hydrate, blending said oil medium containing said dispersion of powdered uranium compound with a quantity of the order of 8 cc. to 40 cc. per 100 grams of said uranium compound of an aqueous phase selected from the group consisting of water and a mixture of water and an affinitizing agent, said affinitizing agent being effective to moisten the surface of said powdered uranium compound and to facilitate the movement of said powder uranium compound dispersed in said oil medium to said aqueous phase said affinitizing agent being selected from at least one member of the group which consists of mineral acid, ammonium carbonate, uranyl nitrate, uranyl chloride, ammonium oxalate, neutral and ionic interface activators, and granulating said dispersed uranium compound by agitating said aqueous phase with said oil medium to disperse said aqueous phase as globules in said oil medium whereby said powdered uranium compound is transferred to said aqueous phase and is formed into spherical granules.

7. A method of producing spherical uranium nuclear fuel substances which comprises dispersing as a powder in an oil medium a uranium compound which is difficult to dissolve in water and is capable of forming a hydrate, said uranium compound being selected from the group which consists of uranium trioxide, ammonium diuranate and uranium tetrafluoride, blending said oil medium containing said dispersion of powdered uranium compound with a quantity of the order of 8 cc. to 40 cc. per 100 grams of said uranium compound of an aqueous phase selected from the group consisting of water and a mixture of water and an affinitizing agent, said affinitizing agent being effective to moisten the surface of said powdered uranium compound and to facilitate the movement of said powdered uranium compound dispersed in said oil medium to said aqueous phase, said affinitizing agent being selected from at least one member of the group which consists of mineral acid, in concentration up to about 0.3 N, salts consisting of, ammonium carbonate, uranyl nitrate, uranyl chloride, ammonium oxalate, in concentration up to about 6%, neutral and ionic interface activators in concentration of the order of 0.5%, and granulating said dispersed uranium compound by agitating said aqueous phase with said oil medium to disperse said aqueous phase as globules in said oil medium, whereby said powdered uranium compound is transferred to said aqueous phase and is formed into spherical granules.

8. A method of producing spherical uranium trioxide which comprises dispersing uranium trioxide as a powder in an oil medium, blending said oil containing said dispersed uranium trioxide with a quantity of the order of 8 cc. to 20 cc. per 100 g. of uranium trioxide of an aqueous phase containing nitric acid in concentration up to about 0.3 N and uranyl nitrate in concentration up to about 6%, and granulating said dispersed uranium trioxide by agitating said aqueous phase with said oil medium to disperse said aqueous phase as globules in said oil medium, whereby said powdered uranium trioxide is transferred to said aqueous phase and is formed into spherical granules.

(References on following page)

References Cited by the Examiner

UNITED STATES PATENTS 2,872,719   2/1959   Brassfield et al. ____ 204—154.2

FOREIGN PATENTS 792,114   3/1958   Great Britain.

L. DEWAYNE RUTLEDGE, *Acting Primary Examiner.*
REUBEN EPSTEIN, CARL D. QUARFORTH,
*Examiners.*
R. W. MacDONALD, A. G. BOWEN,
*Assistant Examiners.*